3,408,402
MONO-ETHERS OF 2,2'-DIHYDROXYDIPHENYL SULFONE AND METHOD OF MAKING THE SULFONE AND MONO-ETHERS
Robert H. Callighan, John O. Hawthorne, and Edward L. Mihelic, Penn Hills Township, Allegheny County, Pa., assignors to United States Steel Corporation, a corporation of Delaware
No Drawing. Filed Dec. 3, 1965, Ser. No. 511,322
6 Claims. (Cl. 260—607)

ABSTRACT OF THE DISCLOSURE

Phenyl ether is reacted with sulfur in the presence of aluminum chloride to give phenoxathin. Phenoxathin is then reacted with hydrogen peroxide in acetic acid producing phenoxathin - 10 - dioxide. This product is reacted with an alcohol or a hydroxyalkyl radical, containing potassium hydroxide, to give 2,2' - dihydroxydiphenyl sulfone or 2 - hydroxy - 2' - alkoxydiphenyl sulfone, useful as dye intermediates and bactericides.

This invention relates to novel mono-ethers of 2,2'-dihydroxydiphenyl sulfone and to a method of making both the sulfone and its mono-ethers. In particular, the method involves the cleavage of phenoxathin - 10 - dioxide.

Several methods have been known heretofore for the production of 2,2' - dihydroxydiphenyl sulfone but they have involved numerous steps, costly reagents and have given only small yields. It is the object of our invention to provide a simple process utilizing inexpensive reagents and giving a high yield.

Briefly stated, our method contemplates the reaction of phenoxathin - 10 - dioxide in an alcohol with potassium hydroxide, under heating, to produce the sulfone or an ether thereof directly. Phenoxathin - 10 - dioxide may be easily made from readily available inexpensive compounds.

A complete understanding of our invention may be obtained from the following general explanation and the several specific examples thereof.

We first produce phenoxathin - 10 - dioxide by reacting phenyl ether with sulfur in the presence of aluminum chloride to give phenoxathin. We then react phenoxathin with hydrogen peroxide in acetic acid which results in phenoxathin - 10 - dioxide. Both these reactions are well known.

According to our invention, we react phenoxathin - 10- dioxide in an alcohol, e.g. ROH where R is a lower alkyl radical (such as methyl, ethyl, t-butyl or isopropyl) or a hydroxyalkyl radical (such as hydroxyethyl), containing potassium hydroxide. The reaction is aided by heating the solution to about 100° C. or the reflux temperature of the alcohol is lower. As a result, cleavage of the central ring of the dioxide occurs giving directly 2,2' - dihydroxydiphenyl sulfone or 2 - hydroxy - 2' - alkoxydiphenyl sulfone, as shown below:

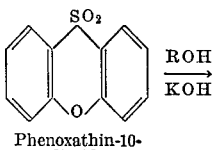

Phenoxathin-10-dioxide

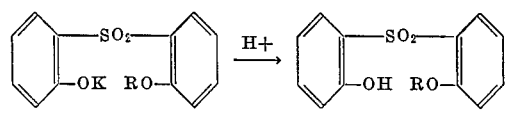

In these products, R is hydrogen, a lower alkyl group other than t-butyl, or a substituted alkyl radical. When t-butyl alcohol is the solvent, the product is 2,2' - dihydroxydiphenyl sulfone. When other alkanols are employed, the product is the corresponding 2 - hydroxy - 2'-alkoxydiphenyl sulfone. The concentration of potassium hydroxide should be between 5 and 15 percent, and at least one molecular equivalent thereof should be used per mole of phenoxathin - 10 - dioxide. The preferred range is 4 to 10 molecular equivalents of potassium hydroxide. Reaction temperature should be about the reflux temperature of the lower alkanols, or about 100° C. for higher-boiling alcohols such as ethylene glycol. Reaction time can vary from 10 to 25 hours, but a range of 15 to 20 hours is preferred.

Further details of our invention may be noted from the following specific examples:

EXAMPLE 1

Phenoxathin - 10 - dioxide (2.32 g.) and 87 percent potassium hydroxide (5.6 g.) were refluxed in t-butyl alcohol (40 ml.) for 22.5 hours with stirring. Water was added, and the t-butyl alcohol-water azeotrope was removed by distillation. A trace of unreacted phenoxathin-10 - dioxide was removed by filtration. 2,2' - dihydroxydiphenyl sulfone (2.5 g.), M.P. 182–188° C., was precipitated by acidification of the aqueous filtrate with a mineral acid such as sulfuric, sufficient to neutralize the phenolic group to a free phenol group and precipitate all the hydroxysulfone. Recrystallization from ethanol-water gave the pure compound (2.0 g.), M.P. 188–190° C.

EXAMPLE 2

Phenoxathin - 10 - dioxide (2.50 g.) and 87 percent potassium hydroxide (5.6 g.) were refluxed in methanol (40 ml.) for 23 hours with stirring. Water (50 ml.) was added and methanol removed by distillation. The aqueous solution was acidified to pH 6 by the addition of a mineral acid, as before, to precipitate 2 - hydroxy - 2' - methoxydiphenyl sulfone (2.8 g.), M.P. 172–174° C.

EXAMPLE 3

Phenoxathin - 10 - dioxide (4.6 g.) and 87 percent potassium hydroxide (5.6 g.) were refluxed in 95 percent ethanol (50 ml.) with stirring for 15 hours. Ethanol was removed by distillation. The residue was mixed with water (100 ml.), and unreacted phenoxathin - 10 - dioxide (0.5 g.) removed by filtration. Acidification of the filtrate to pH 6 by the addition of a mineral acid, as before, precipitated 2 - hydroxy - 2' - ethoxydiphenyl sulfone (4.9 g.), M.P. 118–123° C. Recrystallization from ethanol-water gave the pure product (4.4 g.), M.P. 128–129° C.

EXAMPLE 4

Phenoxathin - 10 - dioxide (2.32 g.) and 87 percent potassium hydroxide (2.8 g.) were refluxed in isopropyl alcohol (50 ml.) with stirring for 19 hours. Isopropyl alcohol was removed by distillation. The residue was mixed with water (50 ml.) and unreacted phenoxathin-10 - dioxide (0.35 g.) was removed by filtration. The aqueous filtrate was acidified to pH 6 by the addition of a mineral acid, as before, to precipitate 2 - hydroxy - 2'-isopropoxydiphenyl sulfone (1.42 g.), M.P. 110–112° C. Recrystallization from ethanol gave crystals (1.0 g.) that melted at 112 to 114 ° C.

EXAMPLE 5

Phenoxathin-10-dioxide (2.32 g.) and 87 percent potassium hydroxide were heated and stirred in ethylene glycol (50 ml.) at 100° C. for 18 hours. Water (100 ml.) was added. The pH was adjusted to 6 by the addition of a mineral acid, as before, and 2-hydroxy-2'-(2-hydroxyethoxy)diphenyl sulfone (2.46 g.), M.P. 147–150° C., was precipitated. Recrystallization from ethanol-water gave crystals (2.32 g.) that melted at 149–150° C.

EXAMPLE 6

It was also found that 2,2'-dihydroxydiphenyl sulfone could be prepared by reacting phenoxathin-10-dioxide and potassium hydroxide in phenyl ether solvent. Phenoxathin-10-dioxide (77.0 g.), phenyl ether (1650 ml.), and 87 percent potassium hydroxide (275 g., pulverized) were charged to a stainless-steel resin flask. The reaction mixture was stirred at 200° C. for 23 hours. After cooling, water (1 liter) was added to the reaction mixture and the organic phase was removed. The aqueous phase was treated with activated charcoal and filtered. Upon acidification of the aqueous solution to pH 6 by the addition of a mineral acid, as before, the precipitated 2,2'-dihydroxydiphenyl sulfone was collected. The dried product weighed 72.3 g., M.P. 189–190° C.

The manner in which the compounds can be used as dye intermediates is illustrated as follows:

Solutions of 2,2'-dihydroxydiphenyl sulfone, 2-hydroxy-2'-methoxydiphenyl sulfone, 2-hydroxy-2'-ethoxydiphenyl sulfone, and 2-hydroxy-2'-isopropoxydiphenyl sulfone were made by adding water (4 ml.) to 0.1 g. of each of the compounds. Sufficient 10 percent aqueous sodium hydroxide to give solution was then added. Strips of clean cotton cloth were saturated in the different alkaline solutions and were dried at ambient temperature. The pieces of cloth were then immersed in a cold, neutral solution of diazotized p-nitroaniline to develop the colors. The cloth pieces were dried, then boiled in water, rinsed, and again dried. The colors produced by the sulfones respectively, were: red-brown, 2,2'-dihydroxydiphenyl sulfone; chocolate-brown, 2-hydroxy-2'-methoxydiphenyl sulfone; tan, 2-hydroxy-2'-ethoxydiphenyl sulfone; and brown-orange, 2-hydroxy-2'-isopropoxydiphenyl sulfone.

Similar colors were obtained by direct dyeing, as follows: A neutral solution of diazotized p-nitroaniline was slowly added to the various alkaline solutions of sulfones until no further dye was precipitated. The dyes were collected, washed with water, and dried. Solutions of the dyes were made in water, and pieces of cotton cloth were boiled in the solutions for 5 minutes. The colors imparted to the cloth were of somewhat less intensity than those imparted by the developing method. The dyes were not removed from the cloth by acetone, ethanol, or boiling water.

2,2'-dihydroxydiphenyl sulfone was demonstrated to have anti-bacterial activity when tested without dilution against *Staphylococcus aureus*, *Escherichia coli*, and *Salmonella chloraesuis* by the agar plate technic (USDA Circular No. 198, 1931; F.D.A. Nutrient Agar; incubation time: 24 hours at 25° C.). The respective widths of zone of inhibition were 3 mm., 2 mm., and 2 mm.

Although we have disclosed herein the preferred practice of our invention, we intend to cover as well any change or modification therein which may be made without departing from the spirit and scope of the invention as set forth in the claims.

We claim:
1. The compound 2-hydroxy-2'-methoxydiphenyl sulfone.
2. The compound 2-hydroxy-2'-ethoxydiphenyl sulfone.
3. The compound 2-hydroxy-2'-isopropoxydiphenyl sulfone.
4. The compound 2-hydroxy-2'-(2 - hydroxyethoxy)diphenyl sulfone.
5. A method of making a chemical compound of the formula:

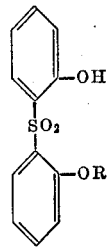

wherein R is a member selected from the group consisting of H—, —CH$_3$, —C$_2$H$_5$, —CH(CH$_3$)$_2$ and —CH$_2$CH$_2$OH, comprising reacting phenoxathin-10-dioxide with 4 to 10 molecular equivalents of potassium hydroxide and an aliphatic alcohol at a temperature of 50° to about 100° C. for 15 to 25 hours followed by acidification to a pH of at least 6, the aliphatic alcohol being selected from the group consisting of methanol, ethanol, isopropanol, t-butanol and ethylene glycol.

6. A process which comprises heating phenoxathin-10-dioxide with preferably 10 molecular equivalent of potassium hydroxide from 15 to 20 hours in an aliphatic alcohol selected from the group consisting of methanol, ethanol, isopropanol, t-butanol and ethylene glycol at reflux temperature of at least 50° to about 100° C. and acidification of the reaction mixture to a pH of at least 6, thereby producing a compound selected from the group consisting of 2-hydroxy-2'-methoxydiphenyl sulfone, 2-hydroxy-2'-ethoxydiphenyl sulfone, 2-hydroxy-2'-isopropoxydiphenyl sulfone, 2-hydroxy-2'-(2-hydroxyethoxy)diphenyl sulfone and 2,2'-dihydroxydiphenyl sulfone.

References Cited

Szmant: J. Am. Chem. Soc., vol. 78, pp. 4384–4385 (1956).

CHARLES B. PARKER, *Primary Examiner.*

D. R. PHILLIPS, *Assistant Examiner.*